US009062740B2

(12) United States Patent
Steinberger et al.

(10) Patent No.: US 9,062,740 B2
(45) Date of Patent: Jun. 23, 2015

(54) TORSION SPRING DAMPER

(75) Inventors: Markus Steinberger, Macedonia, OH (US); Layton Broome, Wooster, OH (US)

(73) Assignee: Schaeffler Technologies AG & Co. KG, Herzogenaurzch (DE)

(*) Notice: Subject to any disclaimer, the term of this patent is extended or adjusted under 35 U.S.C. 154(b) by 845 days.

(21) Appl. No.: 13/284,161

(22) Filed: Oct. 28, 2011

(65) Prior Publication Data
US 2012/0102936 A1 May 3, 2012

Related U.S. Application Data

(60) Provisional application No. 61/407,933, filed on Oct. 29, 2010.

(51) Int. Cl.
*F16F 15/121* (2006.01)
*F16F 15/123* (2006.01)
*F16D 33/00* (2006.01)

(52) U.S. Cl.
CPC ....... *F16F 15/1216* (2013.01); *F16F 15/12366* (2013.01)

(58) Field of Classification Search
CPC ............ F16H 45/02; F16H 2045/0284; F16H 2045/0221; F16H 2045/0294; F16F 15/123; F16F 15/12366; F16F 15/10; F16D 33/00; F16D 2300/22; F16D 33/16

USPC .......... 60/338, 366; 267/154, 155; 188/196 F
See application file for complete search history.

(56) References Cited

U.S. PATENT DOCUMENTS

| 1,991,436 | A | * | 2/1935 | Wemp | ............................ 192/212 |
| 4,181,208 | A | | 1/1980 | Davis | |
| 4,795,012 | A | | 1/1989 | Durum | |
| 5,234,376 | A | | 8/1993 | Chimner et al. | |
| 7,225,614 | B2 | * | 6/2007 | Tanaka et al. | .................... 60/366 |
| 2009/0125202 | A1 | | 5/2009 | Swank et al. | |
| 2009/0272108 | A1 | * | 11/2009 | Degler et al. | .................... 60/338 |

* cited by examiner

*Primary Examiner* — Edward Look
*Assistant Examiner* — Jason Mikus
(74) *Attorney, Agent, or Firm* — Kathryn A. Warner

(57) ABSTRACT

A damper assembly for a torque converter including first and second elastic elements, an input element drivingly engaged with the first elastic element, an intermediate element drivingly engaged with the first elastic element and the second elastic element, and an output element for connecting to an input shaft for a transmission and drivingly engaged with the second elastic element. The assembly also includes a spring element including a circumferentially wound portion and first and second radially extending portions. The first radially extending portion is drivingly engaged with the intermediate element and the second radially extending portion is drivingly engaged with a turbine for the torque converter.

15 Claims, 4 Drawing Sheets

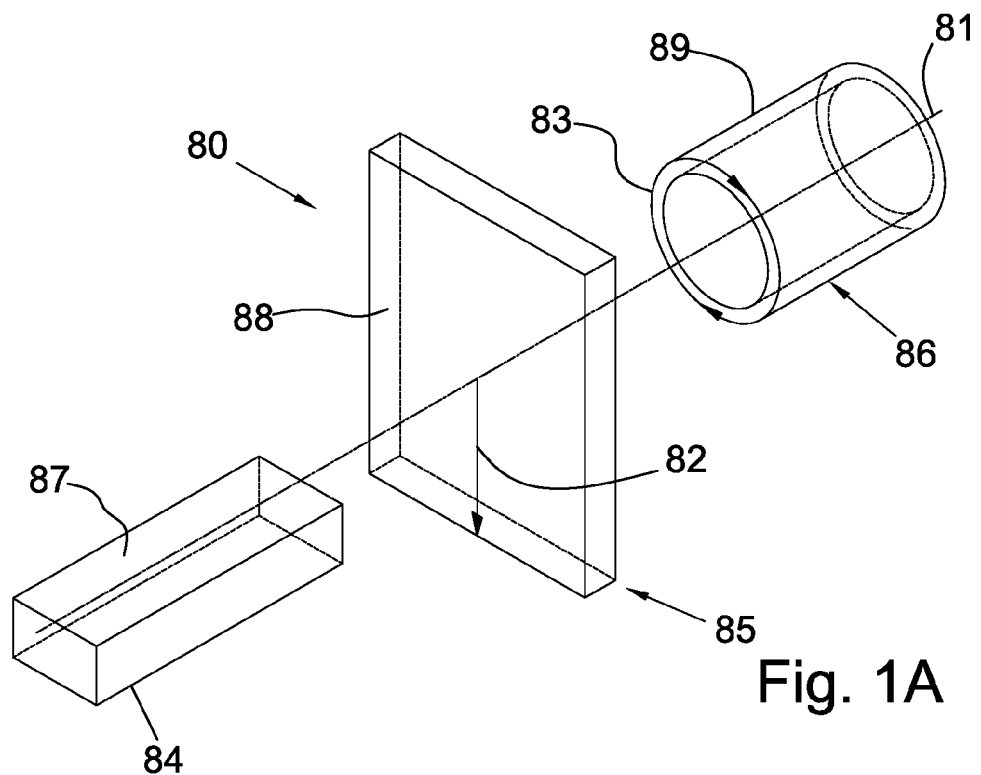
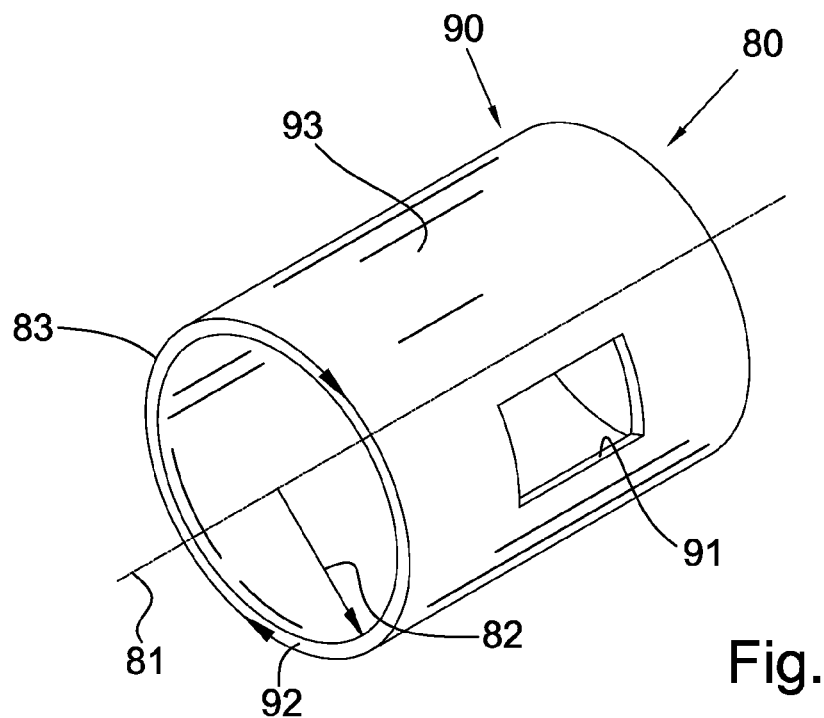

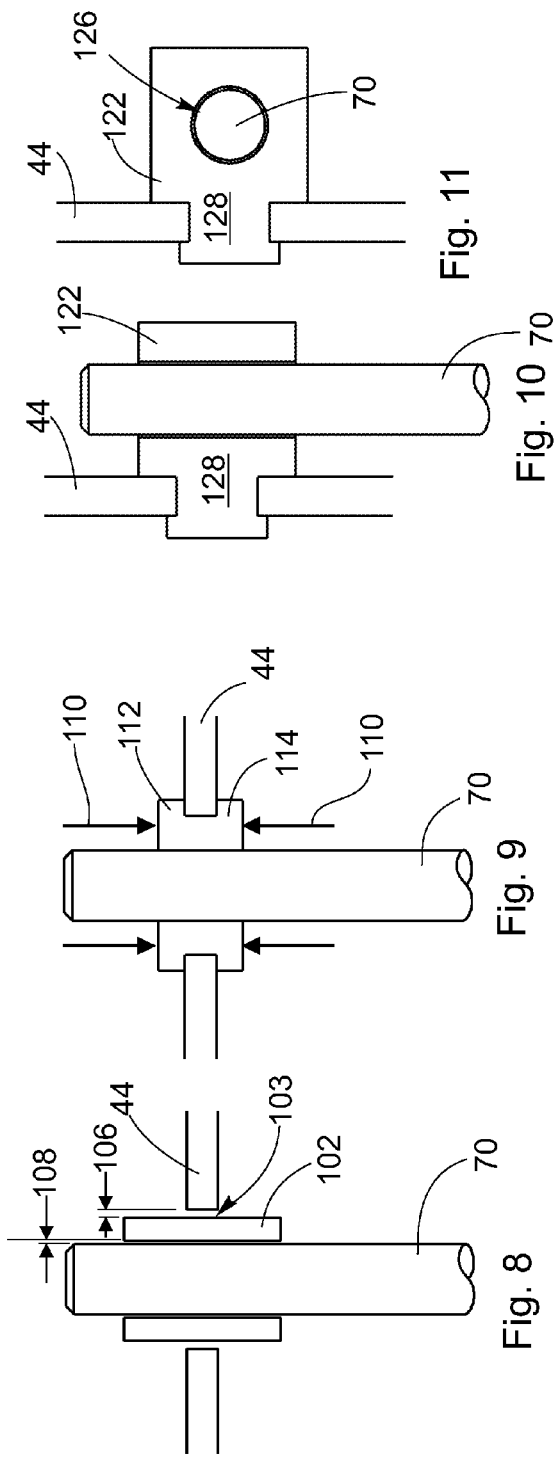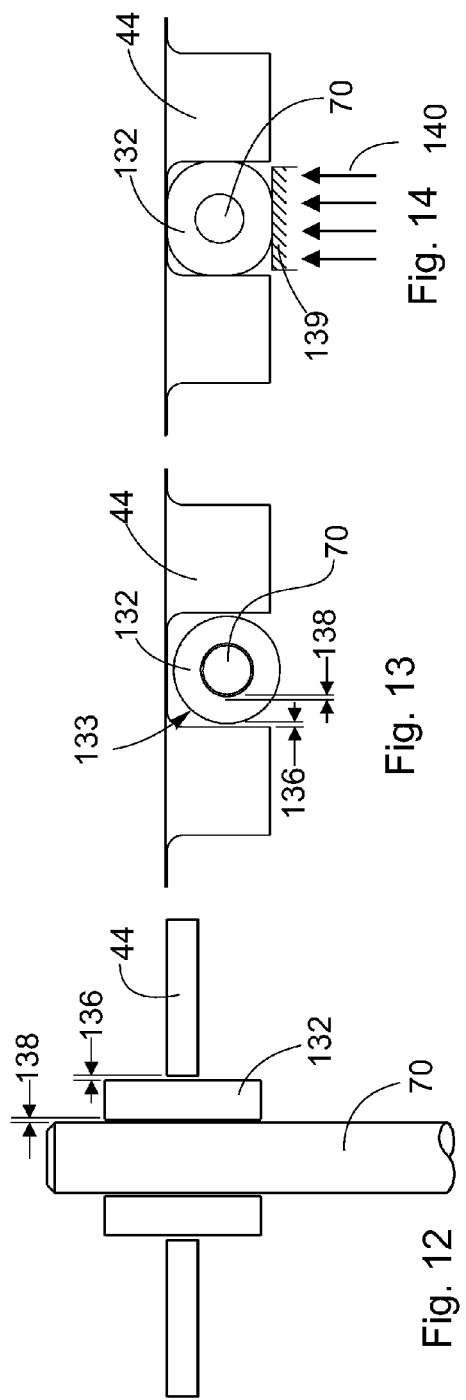

TORSION SPRING DAMPER

FIELD

The invention relates generally to a damper for a torque converter, and more specifically to a turbine mass absorber with a torsion spring.

BACKGROUND

Torsion spring dampers are known. Examples are shown in U.S. Pat. No. 4,181,208 to Davis, U.S. Pat. No. 4,795,012 to Durum, and U.S. Pat. No. 5,234,376 to Chimner et al. A turbine mass absorber is described in commonly-assigned United States Patent Application Publication No. 2009/0125202 to Swank et al., hereby incorporated by reference as if set forth fully herein. In an example embodiment of the Swank publication, the turbine mass absorber includes an elastic member with a linear zero torque transmission.

BRIEF SUMMARY

Example aspects broadly comprise a damper assembly for a torque converter including first and second elastic elements, an input element drivingly engaged with the first elastic element, an intermediate element drivingly engaged with the first elastic element and the second elastic element, and an output element for connecting to an input shaft for a transmission and drivingly engaged with the second elastic element. The assembly also includes a spring element including a circumferentially wound portion and first and second radially extending portions. The first radially extending portion is drivingly engaged with the intermediate element and the second radially extending portion is drivingly engaged with a turbine for the torque converter.

In an example embodiment, the output element is drivingly engaged with the turbine. In an example embodiment, the output element includes a spline portion drivingly engaged with the turbine. In an example embodiment, the torque converter includes a turbine hub connected to the turbine, the spline portion is engaged with the turbine hub, and the connection of the turbine hub and the spline includes lash allowing limited relative rotation between the output element and the turbine. In an example embodiment, the output element includes a hub and the circumferentially wound portion of the spring element encircles the hub. In an example embodiment, the spring element has a round cross-section or a flat cross-section. In an example embodiment, the intermediate element includes a tab for drivingly engaging the first radially extending portion.

In some example embodiments, the damper assembly includes a spring attachment element with an aperture, the spring attachment element is fixedly secured to the intermediate plate and the first radially extending portion is disposed in the spring attachment element aperture. In an example embodiment, the first radially extending portion is radially expanded in the aperture such that the first radially extending portion is fixed to the spring attachment element. In an example embodiment, the spring attachment element is compressed against the first radially extending portion.

In an example embodiment, the first radially extending portion includes a flattened portion with an aperture, the damper assembly includes a rivet disposed in the aperture, and the rivet connects the flattened portion to the intermediate element.

Other example aspects broadly comprise a turbine assembly for a torque converter including first and second elastic elements, an input element drivingly engaged with the first elastic element, an intermediate element drivingly engaged with the first elastic element and the second elastic element, and a turbine. The assembly also includes a turbine hub fixedly attached to the turbine and including a spline portion and an output element drivingly engaged with the second elastic element. The output element includes a first spline portion and a second spline portion. The first spline portion is for connecting to an input shaft for a transmission and the second spline portion is engaged with the turbine hub spline portion so as to have a limited rotation relative to the turbine hub. The turbine assembly also includes a spring element with a circumferentially wound portion arranged to encircle the output element, and first and second radially extending portions. The first radially extending portion is drivingly engaged with the intermediate element and the second radially extending portion is drivingly engaged with the turbine hub.

In an example embodiment, the spring element has a round cross-section or a flat cross-section. In an example embodiment, the intermediate element or the turbine hub includes a tab drivingly engaged with the first or second radially extending portion. In some example embodiments, the turbine assembly includes a spring attachment element with an aperture. The spring attachment element is fixedly secured to the intermediate plate or the turbine hub, and the first or second radially extending portion is disposed in the spring attachment element aperture. In an example embodiment, the first or second radially extending portion is radially expanded in the aperture. In an example embodiment, the spring attachment element is compressed against the first or second radially extending portion.

In an example embodiment, the first or second radially extending portion includes a flattened portion with an aperture, the turbine assembly includes a rivet disposed in the aperture, and the flattened portion is connected to the intermediate element or the turbine hub by the rivet.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 8 is a side view of a radial portion with a sleeve disposed in a plate before compression;

FIG. 9 is a side view of the assembly of FIG. 8 after compression;

FIG. 10 is a side view of a radial portion with a spring attachment element disposed in a plate;

FIG. 11 is a top view of the assembly of FIG. 10;

FIG. 12 is a side view of a radial portion with a sleeve disposed in a plate before compression;

FIG. 13 is a top view of the assembly of FIG. 12 before compression;

FIG. 14 is a top view of the assembly of FIG. 12 after compression.

DETAILED DESCRIPTION OF THE INVENTION

Figures 2, 3:
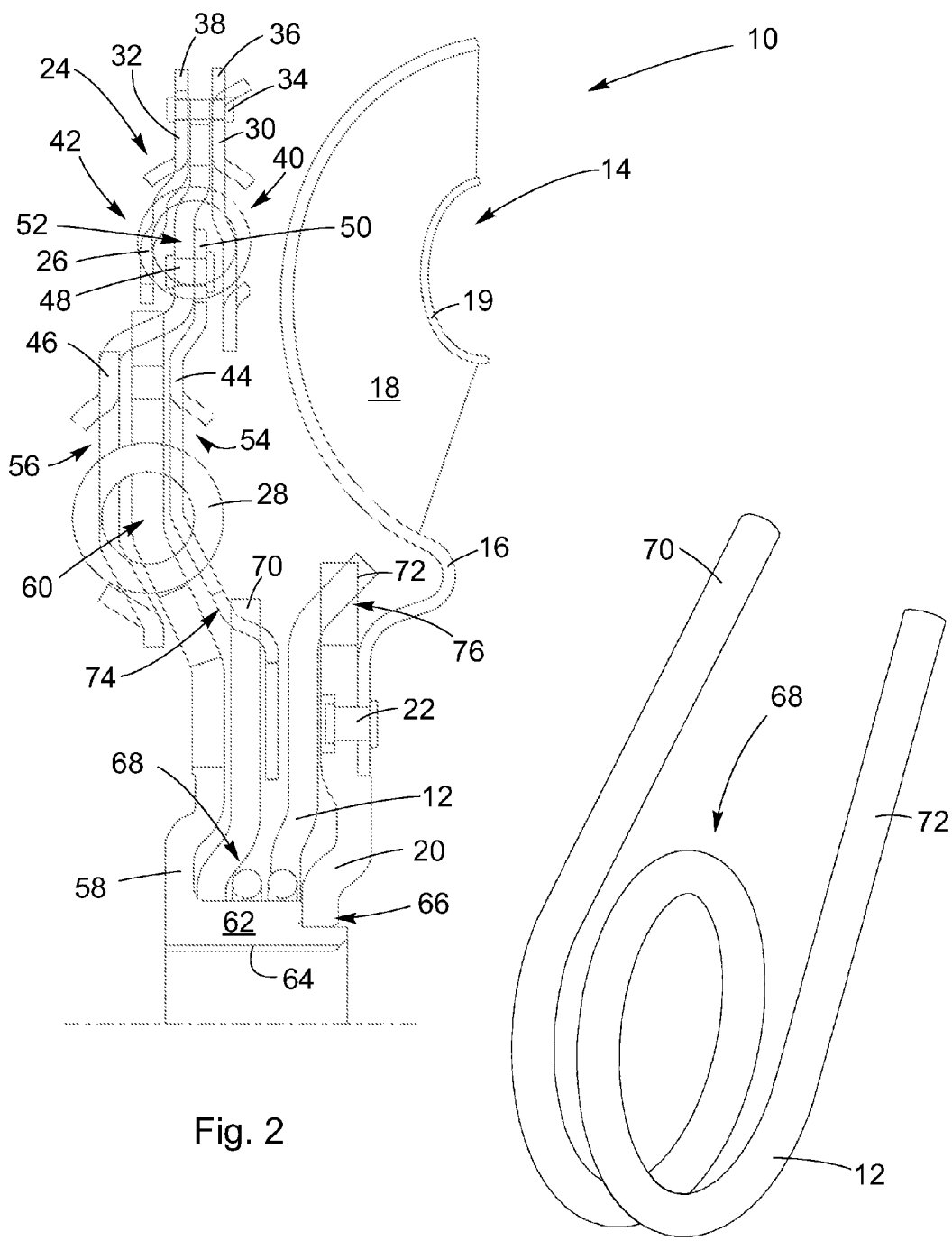
FIG. 2 is a cross-sectional view of a turbine mass absorber with a torsion spring according to an example embodiment of the invention.
FIG. 3 is a perspective view of an example embodiment of a torsion spring.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a cross-sectional view of turbine mass absorber 10 with torsion spring 12 according to an example embodiment of the invention. Turbine assembly 14 includes shell 16, blades 18, core ring 19, and turbine hub 20. Although turbine shell 16 is shown riveted to hub 20 with rivet 22, shell 16 and hub 20 may be connected by any means known in the art. In other example embodiments (not shown), shell 16 and hub 20 may be connected by welding or staking. Similarly, in an example embodiment (not shown), hub 20 may be an integral to shell 16.

Damper assembly 24 includes respective pluralities of elastic elements 26 and 28. In the example embodiment shown in FIG. 1, elements 26 and 28 are coil springs. In other example embodiments (not shown), elements 26 and/or 28 may be arc springs.

Input elements, or cover plates, 30 and 32 are attached at rivet 34. Rivet 34 may be a sheet metal rivet, for example. Plates 30 and 32 include respective radial tabs 36 and 38 for attachment to a clutch (not shown) for the torque converter. In an example embodiment (not shown), tabs 36 and 38 are engaged with a piston plate (not shown) for the clutch. In another example embodiment, tabs 36 and 38 are engaged with a clutch plate (not shown) for the clutch. Spring 26 is drivingly engaged with plates 30 and 32 at respective spring windows 40 and 42. That is, windows 40 and 42 includes radial surfaces engaged with circumferential ends of spring 26.

Intermediate elements 44 and 46 are connected by rivet 48, and drivingly engaged with springs 26 and 28 at radial tab 50 and window 52, and windows 54 and 56, respectively. Output element, or hub, 58 is drivingly engaged with spring 28 at window 60. Element 58 includes hub portion 62 with spline 64 for connecting to an input shaft for a transmission (not shown) Hub portion 62 is slidingly engaged with turbine hub 20 at surface 66. Surface 66 may be a spline interface with lash, permitting limited angular rotation of hub 20 relative to hub portion 62.

The following description is made with reference to FIGS. 2 and 3. FIG. 3 is a perspective view of an example embodiment of torsion spring 12. Spring 12 includes circumferentially wound portion 68 and radially extending portions 70 and 72. Although portions 70 and 72 are shown extending in a similar radial direction, other embodiments are possible. For example, portions 70 and 72 may extend from circumferential portion 68 in radially opposite directions. As shown in FIG. 2, portion 68 is arranged to encircle hub 62 and an input shaft for the transmission (not shown).

Portions 70 and 72 are drivingly engaged with intermediate element 44 and turbine 14, respectively. That is, as shown in FIG. 2, element 44 and hub 20 include respective tabs or slotted portions 74 and 76 for receiving portions 70 and 72, respectively. It should be noted that portion 70 is tightly fitted into slot 74 and portion 72 is tightly fitted into slot 76 so that there is no circumferential lash between the components. Although spring 12, element 44 and hub 20 are shown connected by segments disposed in slotted portions, other attachments are possible, as described below.

During a lockup operating condition for the torque converter, spring 12 and turbine 14 work with damper 24 to function as a turbine mass absorber. That is, spring 12 permits inertia of turbine 14 to oscillate out of phase with oscillation of intermediate elements 44 and 46 to lessen vibrations transmitted to the transmission input shaft (not shown). During an open operating condition for the torque converter, torque exceeding a predetermined capacity of spring 12 is transmitted directly from turbine 14 to hub 58 through turbine hub 20 and spline connection 66. Connection 66 limits rotational windup of spring 12, improving durability.

Figure 4:
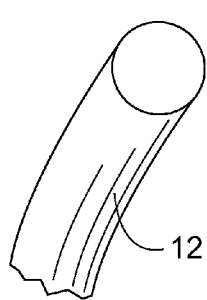
FIG. 4 is a perspective view of a portion of a torsion spring with a round cross-section.
Figure 5:
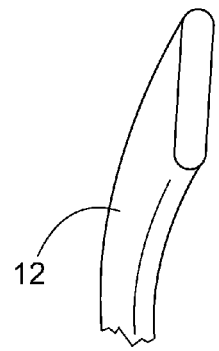
FIG. 5 is a perspective view of a portion of an alternative embodiment of a torsion spring with a flattened cross-section.
Figure 5A:
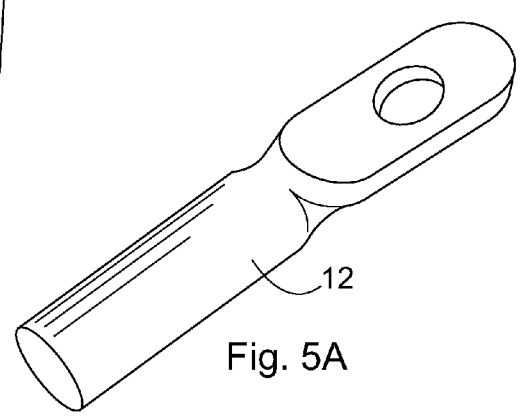
FIG. 5A is a perspective view of an alternative embodiment of a radially extending portion with a flattened portion and an aperture for receiving a rivet.
Figure 6:
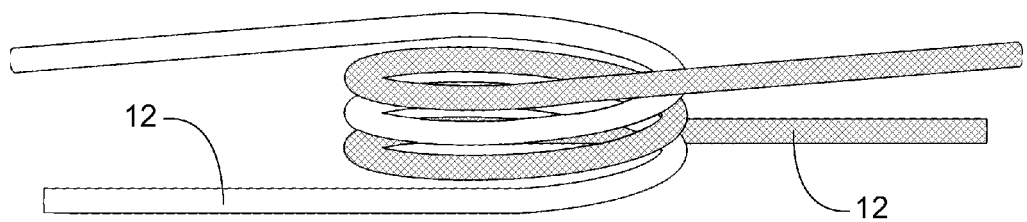
FIG. 6 is a perspective view of a pair of torsion springs.
Figure 7:
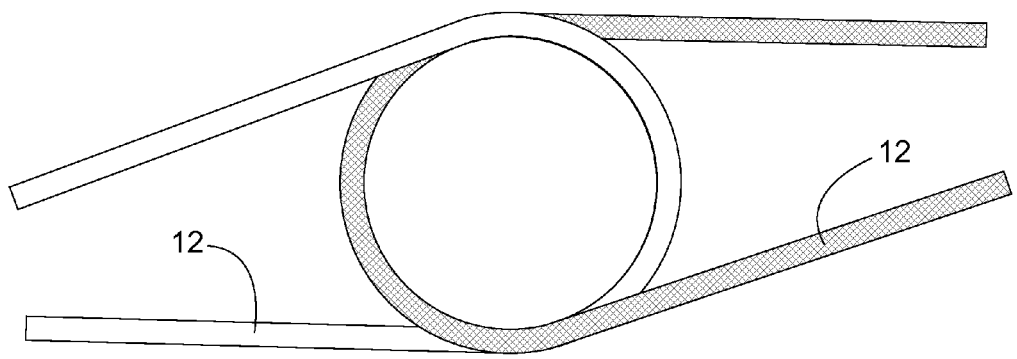
FIG. 7 is an end view of the pair of springs shown in FIG. 6.

The following description is made with reference to FIGS. 4-7. FIG. 4 is a perspective view of a portion of torsion spring 12 with a round cross-section. FIG. 5 is a perspective view of an alternative embodiment of torsion spring 12 with a flattened cross-section. FIG. 5A is a perspective view of an alternative embodiment of radially extending portion 70 with a flattened portion and an aperture for receiving a rivet. FIG. 6 is a perspective view of a pair of torsion springs 12. FIG. 7 is an end view of the pair of springs shown in FIG. 6.

Spring 12 is a wound, metal spring. Torsional properties of spring 12 may be adjusted by varying its profile. For example, spring 12 may have a circular cross-section as shown in FIG. 4, or a flattened cross section as shown in FIG. 5. In general, the cross-section shown in FIG. 5 would yield a higher spring rate than the cross-section shown in FIG. 4. In an example embodiment shown in FIG. 5A, spring 12 includes a circumferential portion and a flattened end portion having an aperture for fixedly attaching (i.e., riveting) spring 12 to plate 44 and/or hub 20. Also, as shown in FIGS. 6 and 7, sets of springs may be used together to adjust the spring rate and balance the spring force. Adjustment of the spring rate facilitates damper tuning to improve damper performance.

Spring 12 may be tightly assembled to plate 44 and/or hub 20 in various ways, including the example attachments described below. The following description is made with reference to FIGS. 8 and 9. FIG. 8 is a side view of radial portion 70 (or 72) of spring 12 with sleeve 102 disposed in plate 44 (or hub 20) before compression. FIG. 9 is a side view of the assembly of FIG. 8 after compression. Radial portion 70 and sleeve 102 are disposed in aperture 103 in plate 44 with a loose fit indicated by gaps 106 and 108. In an example embodiment, sleeve 102 is made from a ductile material. Axial force applied by a tool (not shown) in direction of arrows 110 compresses sleeve 102, radially expanding sleeve 102 to fill gaps 106 and 108. Further compression of sleeve 102 forms head portions 112 and 114. After compression, portion 70 is tightly fitted to plate 44 without clearance or lash.

The following description is made with reference to FIGS. 10 and 11. FIG. 10 is a side view of radial portion 70 (or 72) with spring attachment element, or rivet, 122 disposed in plate 44 (or hub 20). FIG. 11 is a top view of the assembly of FIG. 10. Radial portion 70 is disposed in aperture 126 in rivet 122. Rivet 122 is fixed to plate 44 (or hub 20) by expansion of body portion 128. That is, in an example embodiment (not shown), damper assembly 24 and/or turbine 14 includes spring attachment element 122 with aperture 126 for receiving spring element 12. Spring attachment element 122 is fixedly secured to intermediate plate 44 and/or turbine hub 20, and radially extending portion 70 is disposed in spring attachment element aperture 126. Portion 70 may be radially expanded in aperture 126 by axial force applied to portion 70, or spring attachment element 122 may be radially compressed against portion 70 so that portion 70 is tightly fitted to plate 44 by element 122 without clearance or lash.

The following description is made with reference to FIGS. 12-14. FIG. 12 is a side view of radial portion 70 with sleeve 132 disposed in plate 44 before compression. FIG. 13 is a top view of the assembly of FIG. 12 before compression. FIG. 14 is a top view of the assembly of FIG. 12 after compression. Radial portion 70 and sleeve 132 are disposed in slot 133 in plate 44 (or hub 20) with a loose fit indicated by gaps 136 and 138. In an example embodiment, sleeve 132 is made from a ductile material. Force applied by tool 139 (FIG. 14) in direction of arrows 140 expands sleeve 132, radially expanding sleeve 132 to fill gaps 136 and 138. After expansion, portion 70 is tightly fitted in slot 133 of plate 44 without clearance or lash.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A damper assembly for a torque converter comprising:
   first and second elastic elements;
   an input element drivingly engaged with the first elastic element;
   an intermediate element drivingly engaged with the first elastic element and the second elastic element;
   an output element for connecting to an input shaft for a transmission and drivingly engaged with the second elastic element;
   a spring element including a circumferentially wound portion and first and second radially extending portions, the first radially extending portion is drivingly engaged with the intermediate element and the second radially extending portion is drivingly engaged with a turbine for the torque converter; and,
   a spring attachment element with an aperture, wherein the spring attachment element is fixedly secured to the intermediate plate and the first radially extending portion is disposed in the spring attachment element aperture.

2. The damper assembly of claim 1, wherein the output element is drivingly engaged with the turbine.

3. The damper assembly of claim 2 wherein the output element includes a spline portion drivingly engaged with the turbine.

4. The damper assembly of claim 3, wherein:
   the torque converter includes a turbine hub connected to the turbine;
   the spline portion is engaged with the turbine hub; and,
   the connection of the turbine hub and the spline includes lash allowing limited relative rotation between the output element and the turbine.

5. The damper assembly of claim 1, wherein the output element includes a hub and the circumferentially wound portion of the spring element encircles the hub.

6. The damper assembly of claim 1, wherein the spring element has a round cross-section or a flat cross-section.

7. The damper assembly of claim 1, wherein the intermediate element includes a tab for drivingly engaging the first radially extending portion.

8. The damper assembly of claim 1, wherein the first radially extending portion is radially expanded in the aperture such that the first radially extending portion is fixed to the spring attachment element.

9. The damper assembly of claim 1, wherein the spring attachment element is compressed against the first radially extending portion.

10. A damper assembly for a torque converter comprising:
    first and second elastic elements;
    an input element drivingly engaged with the first elastic element;
    an intermediate element drivingly engaged with the first elastic element and the second elastic element;
    an output element for connecting to an input shaft for a transmission and drivingly engaged with the second elastic element;

a spring element including a circumferentially wound portion and first and second radially extending portions, the first radially extending portion is drivingly engaged with the intermediate element and the second radially extending portion is drivingly engaged with a turbine for the torque converter;

wherein the first radially extending portion includes a flattened portion with an aperture, the damper assembly comprises a rivet disposed in the aperture, and the rivet connects the flattened portion to the intermediate element.

11. A turbine assembly for a torque converter comprising:

first and second elastic elements;

an input element drivingly engaged with the first elastic element;

an intermediate element drivingly engaged with the first elastic element and the second elastic element;

a turbine;

a turbine hub fixedly attached to the turbine and including a spline portion;

an output element drivingly engaged with the second elastic element and including a first spline portion and a second spline portion, wherein the first spline portion is for connecting to an input shaft for a transmission and the second spline portion is engaged with the turbine hub spline portion so as to have a limited rotation relative to the turbine hub;

a spring element including a circumferentially wound portion arranged to encircle the output element, and first and second radially extending portions, wherein the first radially extending portion is drivingly engaged with the intermediate element and the second radially extending portion is drivingly engaged with the turbine hub; and, a spring attachment element with an aperture, wherein the spring attachment element is fixedly secured to the intermediate plate or the turbine hub, and the first or second radially extending portion is disposed in the spring attachment element aperture.

12. The turbine assembly of claim 11, wherein the spring element has a round cross-section or a flat cross-section.

13. The turbine assembly of claim 11, wherein the intermediate element or the turbine hub includes a tab drivingly engaged with the first or second radially extending portion.

14. The turbine assembly of claim 11, wherein the first or second radially extending portion is radially expanded in the aperture.

15. The turbine assembly of claim 11, wherein the spring attachment element is compressed against the first or second radially extending portion.

* * * * *